United States Patent [19]

Maes et al.

[11] Patent Number: 5,366,651
[45] Date of Patent: Nov. 22, 1994

[54] CORROSION-INHIBITED ANTIFREEZE FORMULATIONS HAVING MONOCARBOXYLIC, TRIAZOLE, AND IMIDAZOLE COMPOUNDS

[75] Inventors: Jean-Pierre Maes, Merelbeke; Walter A. van Neste, St. Amandsberg, both of

[73] Assignee: Texaco Services (Europe) Ltd., White Plains, N.Y.

[21] Appl. No.: 39,591

[22] Filed: Mar. 26, 1993

[30] Foreign Application Priority Data

Apr. 6, 1992 [EP] European Pat. Off. ........ 92303005.0

[51] Int. Cl.$^5$ .............................................. C09K 5/00
[52] U.S. Cl. .......................................... 252/76; 252/75; 252/73; 252/74; 252/77; 252/390; 252/391
[58] Field of Search ................ 252/73, 74, 75, 76, 252/390; 422/17, 19

[56] References Cited

U.S. PATENT DOCUMENTS

| | | | |
|---|---|---|---|
| 4,000,079 | 12/1976 | Rasp et al. | 252/75 |
| 4,389,371 | 6/1983 | Wilson et al. | 422/15 |
| 4,647,392 | 3/1987 | Darden et al. | 252/75 |

FOREIGN PATENT DOCUMENTS

| | | | |
|---|---|---|---|
| 0251480 | 1/1988 | European Pat. Off. | C09K 5/00 |
| 0308037 | 3/1989 | European Pat. Off. | C09K 5/00 |
| 0352120 | 1/1990 | European Pat. Off. | C09K 5/00 |
| 2059432A | 4/1981 | United Kingdom | C09K 3/18 |
| 2122598A | 1/1984 | United Kingdom | C23F 11/10 |

OTHER PUBLICATIONS

Fay, R. H., "Antifreezes and Deicing Fluids," *Kirk-Othmer Encyclopedia of Chemical Technology* (1978 ed.), vol. 3, pp. 79–95 no month available.

Hersch, P. et al., "An Experimental Survey of Rust Preventives In Water–II". The 1961, pp. 251–265 11 Jul. 1961.

G. Butler & A. D. Mercer, "Inhibitor Formulations for Engine Coolants," *British Corrosion Journal*, vol. 12, No. 3 (1977), pp. 171–174 (Sep. 1977).

*Primary Examiner*—Paul Lieberman
*Assistant Examiner*—Necholus Ogden
*Attorney, Agent, or Firm*—George J. Darsa; Henry H. Gibson

[57] ABSTRACT

Antifreeze concentrate is disclosed having water soluble liquid alcohol freezing point depressant and corrosion inhibitor comprising carboxylic acids or their salts and a triazole compound, wherein the concentrate contains: (1) $C_5$–$C_{16}$ aliphatic monobasic acid or the alkali metal, ammonium or amine salt thereof; (2) hydrocarbyl triazole; and (3) imidazole.

12 Claims, 1 Drawing Sheet

CORROSION-INHIBITED ANTIFREEZE FORMULATIONS HAVING MONOCARBOXYLIC, TRIAZOLE, AND IMIDAZOLE COMPOUNDS

BACKGROUND OF THE INVENTION

1. Field of the Invention

This invention relates to a metal corrosion inhibitor for use in aqueous solutions, and to antifreeze/coolant compositions containing such a corrosion inhibitor. More particularly, this invention relates to a corrosion inhibitor comprising a combination of monobasic acids or the alkali metal, ammonium, or amine salts of said acids and a hydrocarbyl triazole together with imidazole, and to antifreeze/coolant compositions containing the same.

2. Description of Related Information

Automobile engine cooling systems contain a variety of metals, including copper, solder, brass, steel, cast iron, aluminum, magnesium, and their alloys. The possibility of corrosive attack on such metals is high, due to the presence of various ions as well as the high temperatures, pressures, and flow rates found in such cooling systems. The presence of corrosion products within the cooling system can interfere with heat transfer from the engine combustion chambers, which may subsequently cause engine overheating and engine component failure due to excess metal temperatures. See generally Fay, R. H., "Antifreezes and Deicing Fluids," in *Kirk-Othmer Encyclopedia of Chemical Technology* (1978 ed.), vol. 3, pp. 79-95. It would therefore be generally advantageous if the formation of corrosion products within automobile cooling systems could be controlled or eliminated. It is one object of the instant invention to provide a corrosion inhibitor useful in the prevention and control of corrosion in automobile engine cooling systems containing various metals.

The trends towards improved fuel economy for automobiles has led to the increased use of aluminum and in some cases magnesium for engine and cooling system components. However, it has been found that pitting and crevice corrosion are particularly prevalent in aluminum-containing cooling systems. Many conventional corrosion inhibitor additives used in automobile cooling systems do not provide adequate protection against the pitting and crevice corrosion phenomena found with various aluminum and magnesium alloys. It would therefore be particularly advantageous if the pitting and crevice corrosion phenomena found in automobile cooling systems containing aluminum or magnesium alloys could be controlled or eliminated. It is another object of the instant invention to provide a corrosion inhibitor for use in automobile cooling systems which prevents or controls pitting and crevice corrosion of aluminum and magnesium metal surfaces.

Corrosion inhibitors employed in automobile antifreeze/coolant formulations are gradually depleted by use and the build-up of corrosion products in the cooling system. It would thus be advantageous if the build-up of corrosion products within the system and subsequent corrosion inhibitor depletion or degradation could be controlled or eliminated. It is a further object of the instant invention to provide a corrosion inhibitor which is less prone to depletion or degradation than traditional corrosion inhibitors used in antifreeze/coolant formulations.

It is well known that various monobasic acids as well as the salts of such acids are individually effective as corrosion inhibitors when employed in antifreeze/coolant formulations. For example, the use of sodium salts of various monobasic acids as mild steel corrosion inhibitors in aqueous solutions is disclosed in Hersch, P., et al., "An Experimental Survey Of Rust Preventives In Water-II. The Screening Of Organic Inhibitors," *Journal of Applied Chemistry*, vol. 11 (July, 1961), pp. 254-55. The use of a mixture of sodium sebacate (the sodium salt of sebacic acid) and benzotriazole as a useful corrosion inhibitor in engine coolants is disclosed in G. Butler & A. D. Mercer, "Inhibitor Formulations for Engine Coolants," *British Corrosion Journal*, vol. 12, no. 3 (1977), pp. 171-74.

Several U.S. and foreign patent references disclose the use of various monobasic acids, or the salts of such acids, as corrosion inhibitors for use in antifreeze/coolant compositions.

U.S. Pat. No. 4,342,596 discloses a corrosion inhibiting composition for metals comprising 5-20 parts of a $C_8$-$C_{20}$ aliphatic monobasic acid, 0.5-4 parts of a lubricant, 0.5-4.0 parts of an amino alkylalkanolamine, 10-35 parts of an aromatic mono- or polycarboxylic acid, and an amine used to form a water-soluble salt with the aromatic acid.

U.S. Pat. No. 3,573,225 discloses a corrosion inhibitor containing 50-100 parts of a salt of a $C_6$-$C_{18}$ saturated carboxylic acid, 20-200 parts of an alkali metal benzoate, and 1-50 parts of an alkanolamide selected from the reaction products of ethanolamines and a saturated $C_6$-$C_{18}$ fatty acid.

British Patent No. 2,122,598 discloses a metal corrosion inhibitor which comprises at least one $C_6$-$C_{10}$ aliphatic carboxylic acid, at least one $C_6$-$C_8$ polyhydroxycarboxylic acid, and at least one aromatic monocarboxylic acid, in which each of the acids is present as a salt.

U.S. Pat. No. 4,759,864 discloses a corrosion-inhibited antifreeze concentrate formulation containing no phosphate, amine or nitrite consisting essentially of liquid alcohol freezing point depressant, a $C_6$-$C_{12}$ aliphatic monobasic acid, an alkali metal borate and a hydrocarbyl triazole.

U.S. Pat. No. 4,647,392 discloses a corrosion inhibitor for use in antifreeze systems comprising the combination of a $C_5$-$C_{16}$ aliphatic monobasic acid, a $C_5$-$C_{16}$ hydrocarbyl dibasic acid and a hydrocarbyl triazole.

European Patent No. 0,251,480 discloses a corrosion inhibitor for use in antifreeze systems comprising the combination of a $C_8$-$C_{12}$ aliphatic monobasic acid, an alkylbenzoic acid, and a hydrocarbyl triazole.

SUMMARY OF THE INVENTION

The present invention is directed to a novel corrosion inhibitor composition for use in aqueous systems, an antifreeze/coolant concentrate containing the inhibitor composition and aqueous antifreeze/coolant compositions containing the inhibitor composition. It has been found that the components of the corrosion inhibitor composition have an improved corrosion inhibiting effect when used in antifreeze/coolant compositions.

The antifreeze concentrate comprises a water soluble liquid alcohol freezing point depressant and a corrosion inhibitor comprising carboxylic acids or their salts and a triazole compound, wherein the concentrate contains: (1) from 0.1 to 15 weight percent, calculated as the free acid, of a $C_5$-$C_{16}$ aliphatic monobasic acid or the alkali metal, ammonium or amine salt thereof; (2) from 0.1 to 0.5 weight percent of a hydrocarbyl triazole; and (3) from 0.05 to 5 weight percent imidazole; said weight percentages being based on the amount of liquid alcohol present.

There is also provided a method of treating aqueous fluids containing a water soluble liquid alcohol freezing point depressant to reduce the corrosion of metals in contact with the fluid by the addition of carboxylic acids or their salts and a triazole compound as corrosion inhibitors, characterized in that: (1) from 0.1 to 15 weight percent, calculated as the free acid, of a $C_5$–$C_{16}$ aliphatic monobasic acid or the alkali metal, ammonium or amine salt thereof; (2) from 0.1 to 0.5 weight percent of a hydrocarbyl triazole; and (3) from 0.05 to 5 weight percent imidazole; are incorporated into the fluid, said weight percentages being based on the amount of the liquid alcohol present.

DETAILED DESCRIPTION OF THE INVENTION

Figure 1:
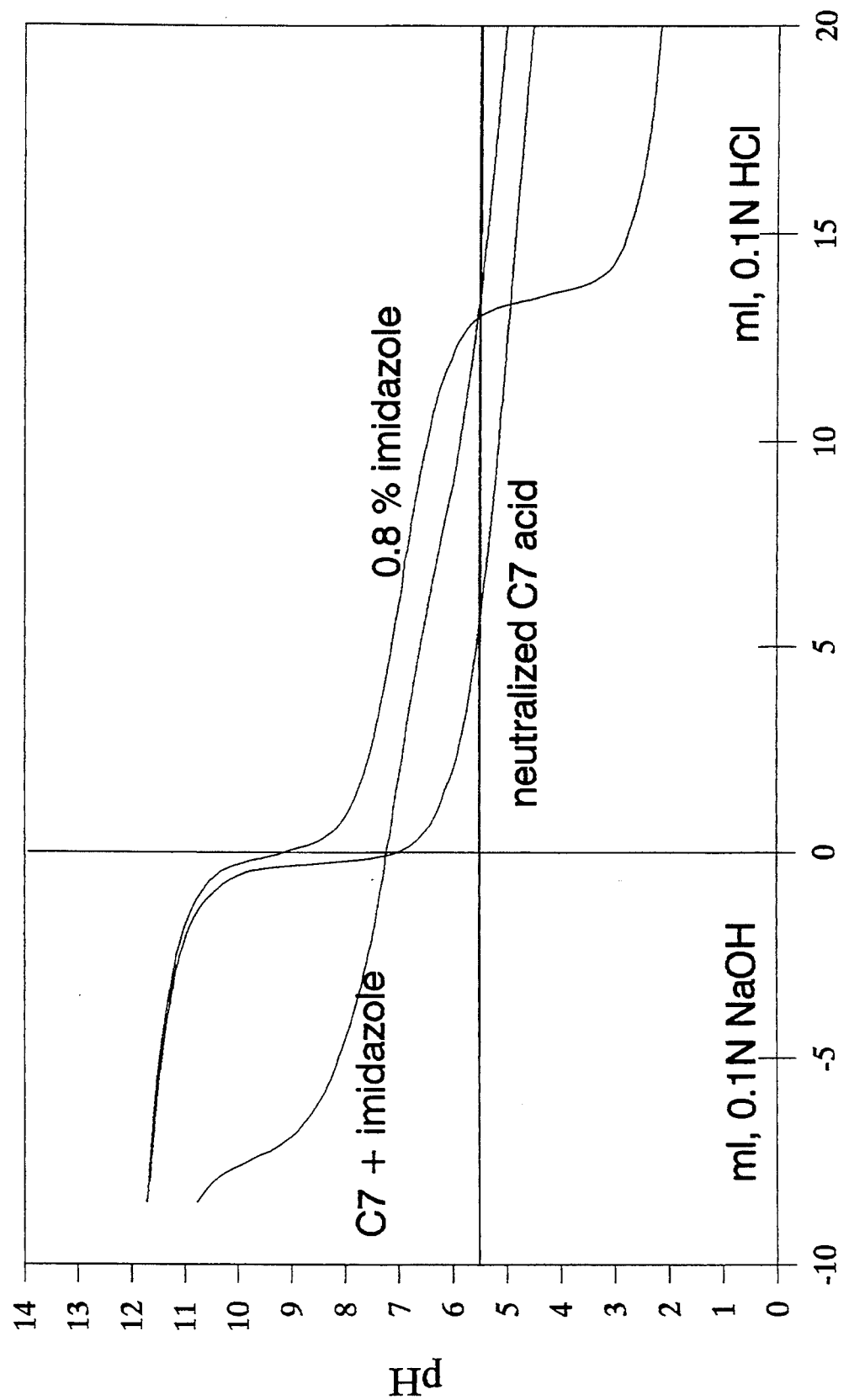

The novel corrosion inhibitor of the instant invention comprises the combination of an aliphatic monobasic acid or the alkali metal, ammonium, or amine salt of said acid, a hydrocarbyl triazole and imidazole for use as a corrosion inhibitor in aqueous systems, particularly in automobile antifreeze/coolant compositions.

The aliphatic monobasic acid component of the above-described corrosion inhibitor may be any $C_5$–$C_{16}$ aliphatic monobasic acid or the alkali metal, ammonium, or amine salt of said acid, preferably at least one $C_6$–$C_{12}$ aliphatic monobasic acid or the alkali metal, ammonium, or amine salt of said acid. This would include one or more of the following acids or isomers thereof: heptanoic, octanoic, nonanoic, decanoic, undecanoic and dodecanoic, and mixtures thereof. Octanoic acid and 2-ethyl hexanoic acid are particularly preferred. Any alkali metal, ammonium, or amine can be used to form the monobasic acid salt; however, alkali metals are preferred. Sodium and potassium are the preferred alkali metals for use in forming the monobasic acid salt.

The hydrocarbyl triazole component of the above-described corrosion inhibitor is preferably an aromatic triazole or an alkyl-substituted aromatic triazole; for example, benzotriazole or tolyltriazole. The most preferred triazole for use is tolyltriazole. The hydrocarbyl triazole is employed at concentrations of about 0.1–0.5 wt % preferably about 0.1–0.3 wt. %. Hydrocarbyl triazoles are useful in improving the corrosion protection of copper and copper alloys.

Imidazole may be added at levels of from 0.05 to 5 weight percent, preferably from 0.1 to 1 weight percent, the weight percent being based on the amount of liquid alcohol present. Alkyl- or aryl-substituted imidazoles may also be used.

The above-described corrosion inhibitor mixture will most typically be employed in antifreeze formulations as coolants for internal combustion engines. Other applications may include hydraulic fluids, aqueous cutting oils, paints, soluble oils, metal cutting fluids, aircraft deicers, and greases. In these applications, the monobasic acid salts may be formed with metal hydroxides including sodium, potassium, lithium, barium, calcium, and magnesium.

The antifreeze formulations most commonly used include mixtures of water and water soluble liquid alcohol freezing point depressants such as glycol and glycol ethers. The glycol ethers which can be employed as major components in the present composition include glycols such as ethylene glycol, diethylene glycol, propylene glycol, and dipropylene glycol, and glycol monoethers such as the methyl, ethyl, propyl and butyl ethers of ethylene glycol, diethylene glycol, propylene glycol, and dipropylene glycol. Ethylene glycol is particularly preferred as the major antifreeze formulation component.

In one preferred embodiment of the instant invention, the above-described corrosion inhibitor is employed in admixture with an aqueous antifreeze/coolant solution comprising 10% to 90% by weight of water, preferably 25% to 50% by weight, a water soluble liquid alcohol freezing point depressant, preferably ethylene glycol.

It has been found that excellent pH control and buffer capacity near neutral pH is provided when using combinations of partly neutralized aliphatic acid corrosion inhibitors and imidazole. Reserve alkalinity, reserve acidity and pH are easily controlled by either modifying the amount of neutralization of the acids and/or the imidazole content. The addition of imidazole assists in the pH control. Alkali metal hydroxides may be added to adjust the pH of the composition to the desired level. The formulations according to the present invention are simple to blend to a near neutral pH range, as is required in engine antifreeze systems.

Dibasic acids may be included in order to further improve corrosion protection, i.e. from 0.1 to 15 weight percent, calculated as the free acid of a $C_5$–$C_{16}$ hydrocarbyl dibasic acid or the salt thereof. The dibasic acid component of the above-described corrosion inhibitor may be any hydrocarbyl $C_5$–$C_{16}$ dibasic acid or the alkali metal, ammonium, or amine salt of said acid, preferably at least one $C_8$–$C_{12}$ hydrocarbyl dibasic acid or the alkali metal, ammonium, or amine salt of said acid. Included within this group are both aromatic and aliphatic $C_5$–$C_{16}$ dibasic acids and salts, preferably $C_8$–$C_{12}$ aliphatic dibasic acids and the alkali metal, ammonium, or amine salts of said acids. This would include one or more of the following acids: suberic, azelaic, sebacic, undecanedioic, dodecanedioic, the diacid of dicyclopentadiene (hereinafter referred to as DCPDDA), terephthalic, and mixtures thereof. Sebacic acid is particularly preferred. Any alkali metal, ammonium, or amine can be used to form the dibasic acid salt; however, alkali metals are preferred. Sodium and potassium are the preferred alkali metals for use in forming the dibasic acid salt. The combination of monobasic acid, dibasic acid, imidazole and hydrocarbyl triazole is particularly preferred.

One or more additional conventional corrosion inhibitors may also be employed in combination with the above-described corrosion inhibitor. Such conventional corrosion inhibitors may be employed at concentrations of 0.01–5.0 wt. %, and may be selected from the group comprising: alkali metal borates, alkali metal silicates, alkali metal benzoates, alkali metal nitrates, alkali metal nitrites, alkali metal molybdates, and hydrocarbyl thiazoles. The most preferred conventional corrosion inhibitors for use in combination with the novel corrosion inhibitor of the instant invention are hydrocarbyl triazoles, hydrocarbyl thiazoles, and sodium metasilicate pentahydrate. Organosilane stabilizers may also be employed in conjunction with the sodium metasilicate pentahydrate.

The method of this invention will be further illustrated by the following examples. In the following examples, all percents are weight percents unless otherwise specified.

EXAMPLES

A number of antifreeze concentrate formulations were prepared comprising a major amount of ethylene glycol (at least 93 wt %).

Example 1 (Comparative)

An antifreeze formulation was prepared comprising a major amount of ethylene glycol, 3.5% ethyl hexanoic acid, and 2% NaOH (50%) to modify the pH of the formulation to between 7.0 and 9.0.

Example 2 (Comparative)

An antifreeze formulation was prepared comprising a major amount of ethylene glycol, 0.2% tolytriazole, and 0.02% NaOH (50%) to modify the pH of the formulation to between 7.0 and 9.0.

Example 3 (Comparative)

An antifreeze formulation was prepared comprising a major amount of ethylene glycol, 0.2% tolytriazole, 3.5% 2-ethyl hexanoic acid, and 2% NaOH (50%) to modify the pH of the formulation to between 7.0 and 9.0.

Example 4 (Comparative)

An antifreeze formulation was prepared comprising a major amount of ethylene glycol, and 0.8% imidazole.

Example 5 (Invention)

An antifreeze formulation was prepared comprising a major amount of ethylene glycol, 0.2% tolytriazole, 3.5% 2-ethyl hexanoic acid, 0.1% imidazole, and 2% NaOH (50%) to modify the pH of the formulation to between 7.0 and 9.0.

Example 6 (Invention)

An antifreeze formulation was prepared comprising a major amount of ethylene glycol, 0.2% tolytriazole, 3.5% 2-ethyl hexanoic acid, 0.8% imidazole, and 1.75% NaOH (50%) to modify the pH of the formulation to between 7.0 and 9.0.

Example 7 (Comparative)

An antifreeze formulation was prepared comprising a major amount of ethylene glycol, 3.5% sebacic acid, and 2.75% NaOH (50%) to modify the pH of the formulation to between 7.0 and 9.0.

Example 8 (Comparative)

An antifreeze formulation was prepared comprising a major amount of ethylene glycol, 0.2% tolytriazole, 3.5% sebacic acid, and 2.8% NaOH (50%) to modify the pH of the formulation to between 7.0 and 9.0.

Example 9 (Comparative)

An antifreeze formulation was prepared comprising a major amount of ethylene glycol, 0.2% tolytriazole, 3.5% sebacic acid, 0.5% imidazole, 2.53% NaOH (50%) to modify the pH of the formulation to between 7.0 and 9.0.

Example 10 (Comparative)

An antifreeze formulation was prepared comprising a major amount of ethylene glycol, 0.2% tolytriazole, 0.85% sebacic acid, 1.65% octanoic acid, and 1.55% NaOH (50%) to modify the pH of the formulation to between 7.0 and 9.0.

Example 11 (Invention)

An antifreeze formulation was prepared comprising a major amount of ethylene glycol, 0.2% tolytriazole, 0.85% sebacic acid, 1.65% octanoic acid, 0.5% imidazole, and 1.55% NaOH (50%) to modify the pH of the formulation to between 7.0 and 9.0.

Example 12 (Comparative)

An antifreeze formulation was prepared comprising a major amount of ethylene glycol, 3.5% hexanoic acid, and 2.13% NaOH (50%) to modify the pH of the formulation to between 7.0 and 9.0.

Example 13 (Invention)

An antifreeze formulation was prepared comprising a major amount of ethylene glycol, 0.2% tolytriazole, 3.5% hexanoic acid, 0.8% imidazole, and 1.76% NaOH (50%) to modify the pH of the formulation to between 7.0 and 9.0.

Example 14 (Comparative)

An antifreeze formulation was prepared comprising a major amount of ethylene glycol, 0.2% tolytriazole, 3.25% 2-ethyl hexanoic acid, 0.25% sebacic acid, and 2.07% NaOH (50%) to modify the pH of the formulation to between 7.0 and 9.0.

Example 15 (Comparative)

An antifreeze formulation was prepared comprising a major amount of ethylene glycol, 0.2% tolytriazole, 3.25% 2-ethyl hexanoic acid, 0.25% sebacic acid, 1.15% borax (10aq), and 2.07% NaOH (50%) to modify the pH of the formulation to between 7.0 and 9.0.

Example 16 (Invention)

An antifreeze formulation was prepared comprising a major amount of ethylene glycol, 0.2% tolytriazole, 3.25% 2-ethyl hexanoic acid, 0.25% sebacic acid, 0.8% imidazole, and 1.85% NaOH (50%) to modify the pH of the formulation to between 7.0 and 9.0.

Table I shows the results of dynamic high temperature corrosion tests carried out according to MTU for an aliphatic acid inhibitor formulation, without buffer, with borate and imidazole. Low corrosion rates are found for the buffer-free formulation and for the formulation containing imidazole as a buffer agent. High corrosion rates are found for the formulation containing borate. It can be seen that although borates may provide pH buffer capacity, corrosion protection of aluminum is affected.

TABLE I

| Duration | 48 hours | Heat input | 1890 W |
|---|---|---|---|
| Pressure | 1.5 bar | Cell input temperature | 85° C. |
| Velocity | 3.5 l/min | Cell output temperature | 92° C. |

| Example | System | Wt loss (mg/coupon) |
|---|---|---|
| Example 14 (Comparative) | Monoacid/diacid inhibitors | 5.1 |
| Example 15 (Comparative) | Monoacid/diacid inhibitors with borate | 62.6 |
| Example 16 (Invention) | Monoacid/diacid inhibitors with imidazole | 1.5 |

The corrosion inhibiting properties of various examples of the instant invention were also tested via Rapid Cyclic Potentiokinetic Polarization Scanning (RCP). This technique is described in the CEBELCOR (Centre Belge d'Etude de la Corrosion) publication *Rapports Techniques*, vol. 147, R.T. 272 (Aug. 1984). The technique measures rupture or pitting potential ($E_R$) as well as repassivation potential ($E_p$). The potentials are measured with a silver reference electrode and a working electrode constructed from the material subject to corrosive attack. The higher (more positive) the $E_R$ value, the more effective a given antifreeze formulation is in preventing pitting corrosion initiation and progress. Similarly, a higher (more positive) $E_p$ value indicates that the particular corrosion inhibitor formulation has a greater ability to repassivate existing pits and crevices.

Table II sets forth data obtained from RCP scans with an aluminum working electrode for various examples. As illustrated by the $E_R$ and $E_p$ data obtained, the instant invention encourages a synergistic resistance to pitting and crevice corrosion attack. Table III sets forth data obtained using a copper electrode.

TABLE II

RAPID CYCLIC POTENTIOKINETIC POLARIZATION (RCP) SCANS TO DETERMINE CORROSION INHIBITOR EFFECTIVENESS ON ALUMINUM
(33% w/w antifreeze in hard corrosive water)

| Example | TTZ | EHA | SA | OA | C7 | IMIDAZOLE | BORAX 10 sq | NaOH (50%) | $E_R$ (mv) | $E_p$ (mv) |
|---|---|---|---|---|---|---|---|---|---|---|
| 1 | — | 3.5 | — | — | — | — | — | 2.00 | 940 | −600 |
| 2 | 0.2 | — | — | — | — | — | — | 0.02 | −460 | −480 |
| 3 | 0.2 | 3.5 | — | — | — | — | — | 2.00 | 950 | −600 |
| 4 | — | — | — | — | — | 0.8 | — | — | −400 | −500 |
| 5 | 0.2 | 3.5 | — | — | — | 0.1 | — | 2.00 | 1680 | 920 |
| 6 | 0.2 | 3.5 | — | — | — | 0.8 | — | 1.75 | 1600 | 960 |
| 7 | — | — | 3.5 | — | — | — | — | 2.75 | 850 | −600 |
| 8 | 0.2 | — | 3.5 | — | — | — | — | 2.80 | 270 | −580 |
| 9 | 0.2 | — | 3.5 | — | — | 0.5 | — | 2.53 | 230 | −500 |
| 10 | 0.2 | — | 0.85 | 1.65 | — | — | — | 1.55 | 1100 | −550 |
| 11 | 0.2 | — | 0.85 | 1.65 | — | 0.5 | — | 1.55 | 1500 | 260 |
| 12 | — | — | — | — | 3.5 | — | — | 2.13 | * | * |
| 13 | 0.2 | — | — | — | 3.5 | 0.8 | — | 1.76 | * | * |
| 14 | 0.2 | 3.25 | 0.25 | — | — | — | — | 2.07 | * | * |
| 15 | 0.2 | 3.25 | 0.25 | — | — | — | 1.15 | 2.07 | * | * |
| 16 | 0.2 | 3.25 | 0.25 | — | — | 0.8 | — | 1.85 | * | * |

*not measured
TTZ - tolyltriazole
EHA - 2-ethyl hexanoic acid
SA - sebacic acid
OA - octanoic acid
C7 - hexanoic acid
$E_R$ - Rupture Pitting Potential at 50 μA
$E_p$ - Repassivation Potential at 50 μA

TABLE III

RAPID CYCLIC POTENTIOKINETIC POLARIZATION (RCP) SCANS TO DETERMINE CORROSION INHIBITOR EFFECTIVENESS ON COPPER
(33% w/w antifreeze in hard corrosive water)

| Example | TTZ | EHA | SA | OA | C7 | IMIDAZOLE | BORAX 10 sq | NaOH (50%) | $E_R$ (mv) | $E_p$ (mv) |
|---|---|---|---|---|---|---|---|---|---|---|
| 1 | — | 3.5 | — | — | — | — | — | 2.00 | 850 | 10 |
| 2 | 0.2 | — | — | — | — | — | — | 0.02 | 750 | 180 |
| 3 | 0.2 | 3.5 | — | — | — | — | — | 2.00 | 1600 | 150 |
| 4 | — | — | — | — | — | 0.8 | — | — | 220 | 220 |
| 5 | 0.2 | 3.5 | — | — | — | 0.1 | — | 2.00 | 1600 | >3000 |
| 6 | 0.2 | 3.5 | — | — | — | 0.8 | — | 1.75 | 1600 | >3000 |
| 7 | — | — | 3.5 | — | — | — | — | 2.75 | 1200 | 1300 |
| 8 | 0.2 | — | 3.5 | — | — | — | — | 2.80 | 1500 | 1700 |
| 9 | 0.2 | — | 3.5 | — | — | 0.5 | — | 2.53 | 1700 | >3000 |
| 10 | 0.2 | — | 0.85 | 1.65 | — | — | — | 1.55 | 1630 | 1620 |
| 11 | 0.2 | — | 0.85 | 1.65 | — | 0.5 | — | 1.55 | 1600 | >3000 |
| 12 | — | — | — | — | 3.5 | — | — | 2.13 | * | * |
| 13 | 0.2 | — | — | — | 3.5 | 0.8 | — | 1.76 | * | * |
| 14 | 0.2 | 3.25 | 0.25 | — | — | — | — | 2.07 | * | * |
| 15 | 0.2 | 3.25 | 0.25 | — | — | — | 1.15 | 2.07 | * | * |
| 16 | 0.2 | 3.25 | 0.25 | — | — | 0.8 | — | 1.85 | * | * |

*not measured
TTZ - tolyltriazole
EHA - 2-ethyl hexanoic acid
SA - sebacic acid
OA - octanoic acid
C7 - hexanoic acid
$E_R$ - Rupture Pitting Potential at 50 μA
$E_p$ - Repassivation Potential at 50 μA It can be seen that compounds comparable to imidazole, such as hydrocarbyl triazoles, do not cause any significant change in pitting and repassivation potential for aluminum. Hydrocarbyl triazoles do, as explained above, improve corrosion protection of copper and copper alloys. Thus Table III shows that the addition Of tolyltriazole to coolant solutions containing, e.g. a monoacid, improves copper protection. The addition of imidazole to such systems is seen to increase $E_R$ and $E_p$.

The synergistic effect shown by the combination of imidazole and monobasic aliphatic acids is not shown if dibasic aliphatic acids are used. However, the synergistic corrosion protection afforded by monoacid-diacid formulations (as discussed in European Patent No. 0,229,440) is enhanced by the use of imidazole.

Figure I demonstrates that excellent pH control and buffer capacity near neutral pH is provided when using combinations of partly neutralized aliphatic acid corrosion inhibitors and imidazole.

Titration curves (pH in function of addition of 0.1N HCl) according to ASTM D1121 (reserve alkalinity) are shown for coolant solutions containing respectively 0.8% imidazole, 3.5% heptanoic acid (C7 monoacid) neutralized to pH 7.2 and the combination of partly neutralized heptanoic acid and imidazole. Similarly, titration curves with 0.1N NaOH are shown (reserve acidity). Percentages are based on monoethylene glycol present. The formulations according to the invention will provide excellent buffering action and neutralize acids introduced into the coolant by, e.g. exhaust gas leakage, by residual acid cleaner or by the oxidation of ethylene glycol.

We claim:

1. An antifreeze concentrate comprising a water soluble liquid alcohol freezing point depressant and a corrosion inhibitor comprising carboxylic acids or their salts and a triazole compound, wherein the concentrate contains: (1) from 0.1 to 15 weight percent, calculated as the free acid, of a $C_5$–$C_{16}$ aliphatic monobasic acid or the alkali metal, ammonium or amine salt thereof; (2) from 0.1 to 0.5 weight percent of a hydrocarbyl triazole; and (3) from 0.05 to 5 weight percent unsubstituted or alkyl substituted imidazole; said weight percentages being based on the amount of liquid alcohol present.

2. The anti-freeze concentrate of claim 1 wherein the concentrate contains from 0.1 to 2.5 weight percent, calculated as the free acid, of a $C_8$–$C_{12}$ aliphatic monobasic acid and from 0.1 to 2.5 weight percent, calculated as the free acid, of a $C_8$–$C_{12}$ hydrocarbyl dibasic acid or the alkali metal, ammonium or amine salts of said acids.

3. The anti-freeze concentrate of claim 1 wherein the aliphatic monobasic acid is octanoic acid and the dibasic acid is sebacic acid.

4. The anti-freeze concentrate of claim 1 wherein the concentrate contains from 0.1 to 0.3 weight percent of tolyltriazole or benzotriazole.

5. The anti-freeze concentrate of claim 1 wherein the concentrate contains an alkali metal borate, silicate, benzoate, nitrate, nitrite, molybdate and/or hydrocarbazole as an additional corrosion inhibitor.

6. The anti-freeze concentrate of claim 5 wherein the additional corrosion inhibitor is present from 0.01 to 5 weight percent.

7. The anti-freeze concentrate of claim 5 wherein the additional corrosion inhibitor is sodium metasilicate pentahydrate.

8. The anti-freeze concentrate of claim 1 wherein the pH of the concentrate is in the range 6.5 to 8.5.

9. The anti-freeze concentrate of claim 8 wherein the pH is adjusted by the addition of sodium hydroxide.

10. The anti-freeze concentrate of claim 1 wherein the liquid alcohol freezing point depressant is ethylene glycol.

11. An aqueous coolant composition having a depressed freezing point comprising water and from 10 to 90 weight percent of an anti-freeze concentrate of claim 1.

12. The antifreeze concentrate of claim 1 wherein the imidazole has a structure:

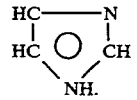

* * * * *